United States Patent
Wu

(10) Patent No.: US 6,484,624 B1
(45) Date of Patent: Nov. 26, 2002

(54) GRILL DEVICE PROVIDED WITH A SEASONING SUPPLYING UNIT

(75) Inventor: Tsan-Kuen Wu, Tainan Hsien (TW)

(73) Assignee: Eupa International Corporation, Las Vegas, NV (US)

( * ) Notice: Subject to any disclaimer, the term of this patent is extended or adjusted under 35 U.S.C. 154(b) by 0 days.

(21) Appl. No.: 10/145,245

(22) Filed: May 14, 2002

(51) Int. Cl.[7] .................... A47J 37/00; A47J 37/06; A47J 37/08; A23L 1/00
(52) U.S. Cl. .................... 99/339; 99/345; 99/347; 99/349; 99/372; 99/374; 99/375; 99/378; 99/400; 99/425; 99/445; 99/446; 99/494
(58) Field of Search .................... 99/331–333, 339, 99/340, 345–347, 349–351, 353–355, 372–382, 400, 401, 444–450, 422–425, 482, 494; 126/369, 20, 41 R, 25 R; 219/521, 524, 525, 386, 401; 426/523, 510, 511

(56) References Cited

U.S. PATENT DOCUMENTS

| | | | | |
|---|---|---|---|---|
| 4,066,010 A | * | 1/1978 | Larsson | 99/346 |
| 5,129,313 A | * | 7/1992 | Coppier | 99/376 |
| 5,606,905 A | * | 3/1997 | Boehm et al. | 99/375 |
| 5,615,604 A | * | 4/1997 | Chenglin | 99/332 |
| 5,845,562 A | * | 12/1998 | Deni et al. | 99/375 |
| 5,848,567 A | * | 12/1998 | Chiang | 99/375 |
| 5,913,965 A | * | 6/1999 | Gargano | 99/346 |
| 6,012,380 A | * | 1/2000 | Hermansson | 99/337 |
| 6,170,389 B1 | * | 1/2001 | Brady | 99/332 |
| 6,389,959 B1 | * | 5/2001 | Robertson | 99/331 |
| 6,257,126 B1 | * | 7/2001 | Veljkovic et al. | 99/349 |
| 6,269,738 B1 | * | 8/2001 | Huang | 99/375 |
| 6,276,263 B1 | * | 8/2001 | Huang | 99/375 |

* cited by examiner

Primary Examiner—Timothy F. Simone
(74) Attorney, Agent, or Firm—Timothy J. Keefer; Widman, Harrold, Allen & Dixon

(57) ABSTRACT

A grill device includes an upper grill unit pivoted to a lower grill unit so as to rotate about an axis between an open position, and a closed position, in which, the upper and lower grill units cooperatively define a cooking space therebetween. A seasoning supplying unit includes a vessel mounted in the cooking space to receive a body of seasonings in liquid form, and a thermal conductive dispenser. The thermal conductive dispenser is extendible into the vessel when the upper grill unit is positioned at the closed position, and defines a plurality of channels. Each of the channel has an inlet that is immersed in seasonings in the vessel, and an outlet that is exposed from the vessel when the upper grill unit is positioned at the closed position.

5 Claims, 4 Drawing Sheets

GRILL DEVICE PROVIDED WITH A SEASONING SUPPLYING UNIT

BACKGROUND OF THE INVENTION

1. Field of the Invention

The invention relates to a grill device, more particularly to a grill device provided with a seasoning supplying unit.

2. Description of the Related Art

Referring to FIG. 1, a conventional grill device is shown to include a lower grill unit 11 with a lower cooking member 111, an upper grill unit 12 with an upper cooking member 121, and a connecting unit which interconnects rear ends of the upper and lower grill units 12, 11 so as to rotate about an axis between an open position, and a closed position, in which, the upper and lower cooking members 121, 111 cooperatively confine a cooking space therebetween.

The aforesaid conventional grill device is disadvantageous in that it is inconvenient for the user to turn the upper grill unit 12 to the open position, whenever he or she wishes to sprinkle seasonings onto a piece of meat being grilled on the lower grill unit 11.

SUMMARY OF THE INVENTION

The object of this invention is to provide a grill device provided with a seasoning supplying unit that can eliminate the occurrence of the aforesaid disadvantage which results during use of the conventional grill device.

Accordingly, a grill device of the present invention includes a lower grill unit, an upper grill unit, and a seasoning supplying unit. The lower grill unit has a rear portion and a top that is provided with a lower cooking member. The upper grill unit has a bottom that is provided with an upper cooking member, and a rear portion pivoted to the rear portion of the lower grill unit so as to rotate about an axis between an open position, and a closed position, in which, the upper and lower cooking members cooperatively confine a cooking space therebetween. The seasoning supplying unit includes a vessel and a thermal conductive dispenser. The vessel is mounted in the cooking space, and is adapted to receive a body of seasonings in liquid form. The thermal conductive dispenser is mounted in the cooking space, and is extendible into the vessel when the upper grill unit is positioned at the closed position. The thermal conductive dispenser defines a plurality of channels. Each of the channels has an inlet that is adapted to immersed in the body of seasonings in the vessel, and an outlet that is exposed from the vessel when the upper grill unit is positioned at the closed position, so that when the thermal conductive dispenser is heated, a stream of seasonings continuously enters from the vessel into each of the channels via the inlet, and is ejected via the outlet into the cooking space by virtue of vaporization of the stream of seasonings in each of the channels.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
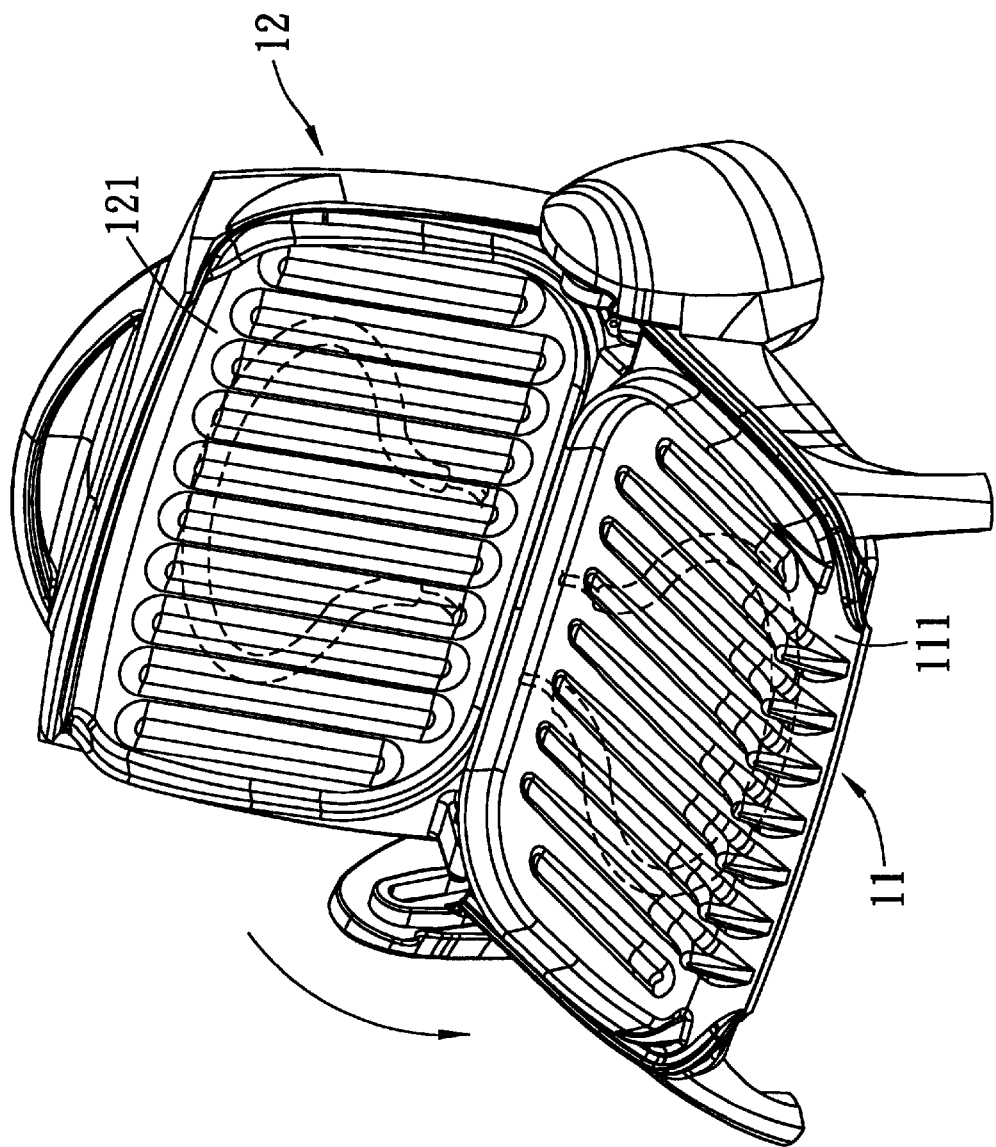
FIG. 1 is a perspective view of a conventional grill device at an open position.
Figure 2:
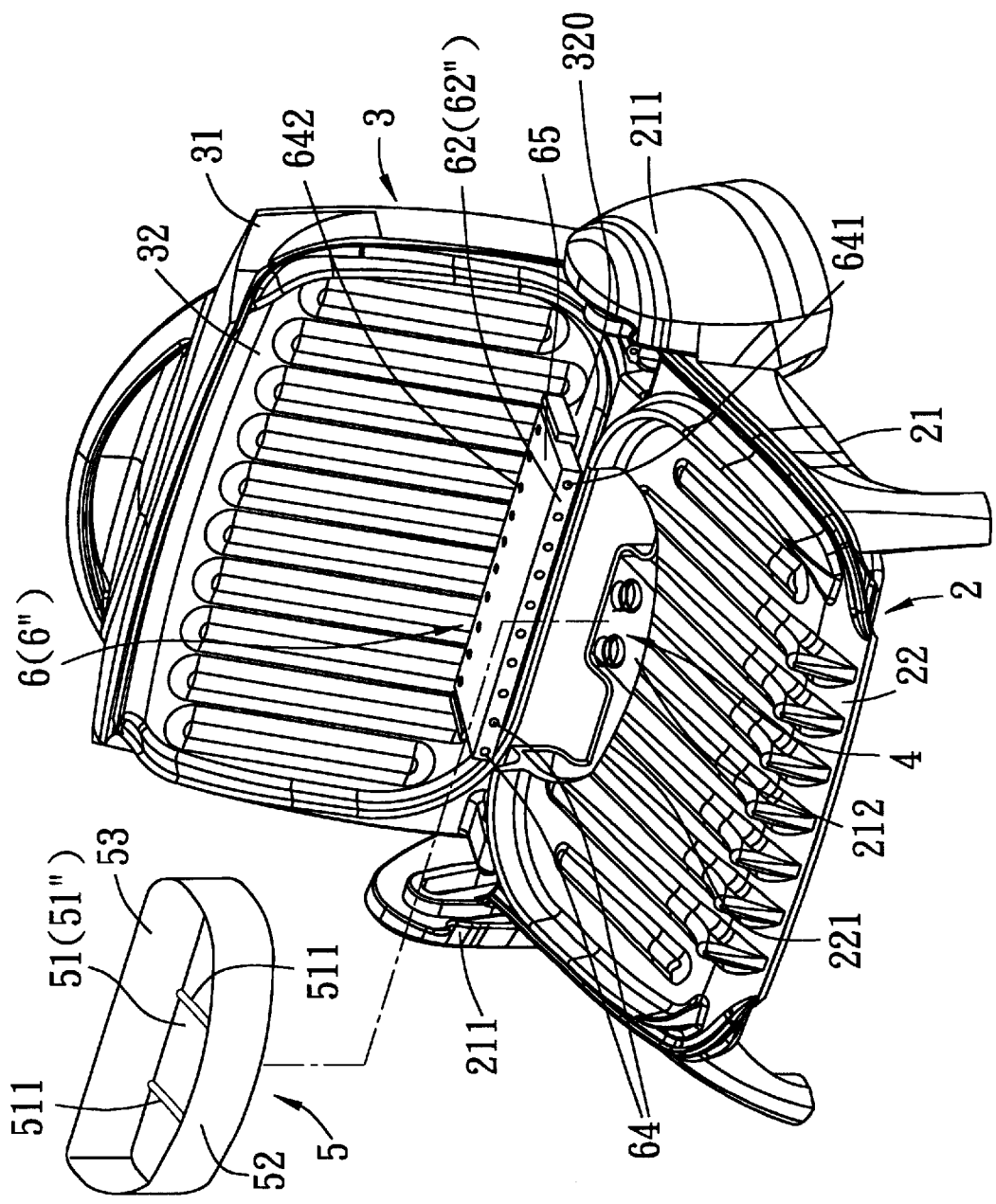
FIG. 2 is a perspective view of the preferred embodiment of a grill device of the present invention at an open position with a vessel removed to illustrate interior of a lower grill unit.
Figure 3:
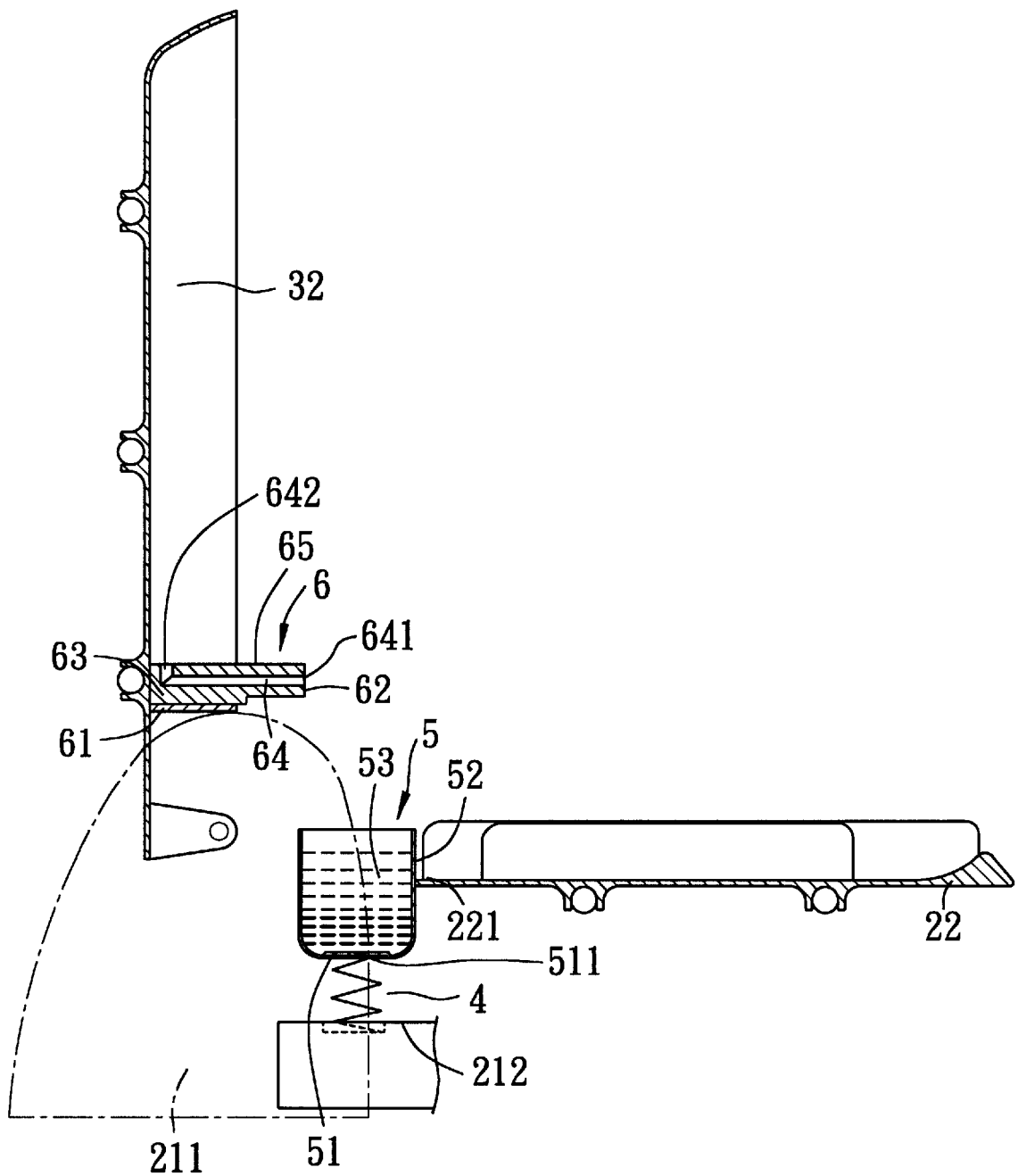
FIG. 3 is an exploded side view of the preferred embodiment shown in FIG. 2.
Figure 4:
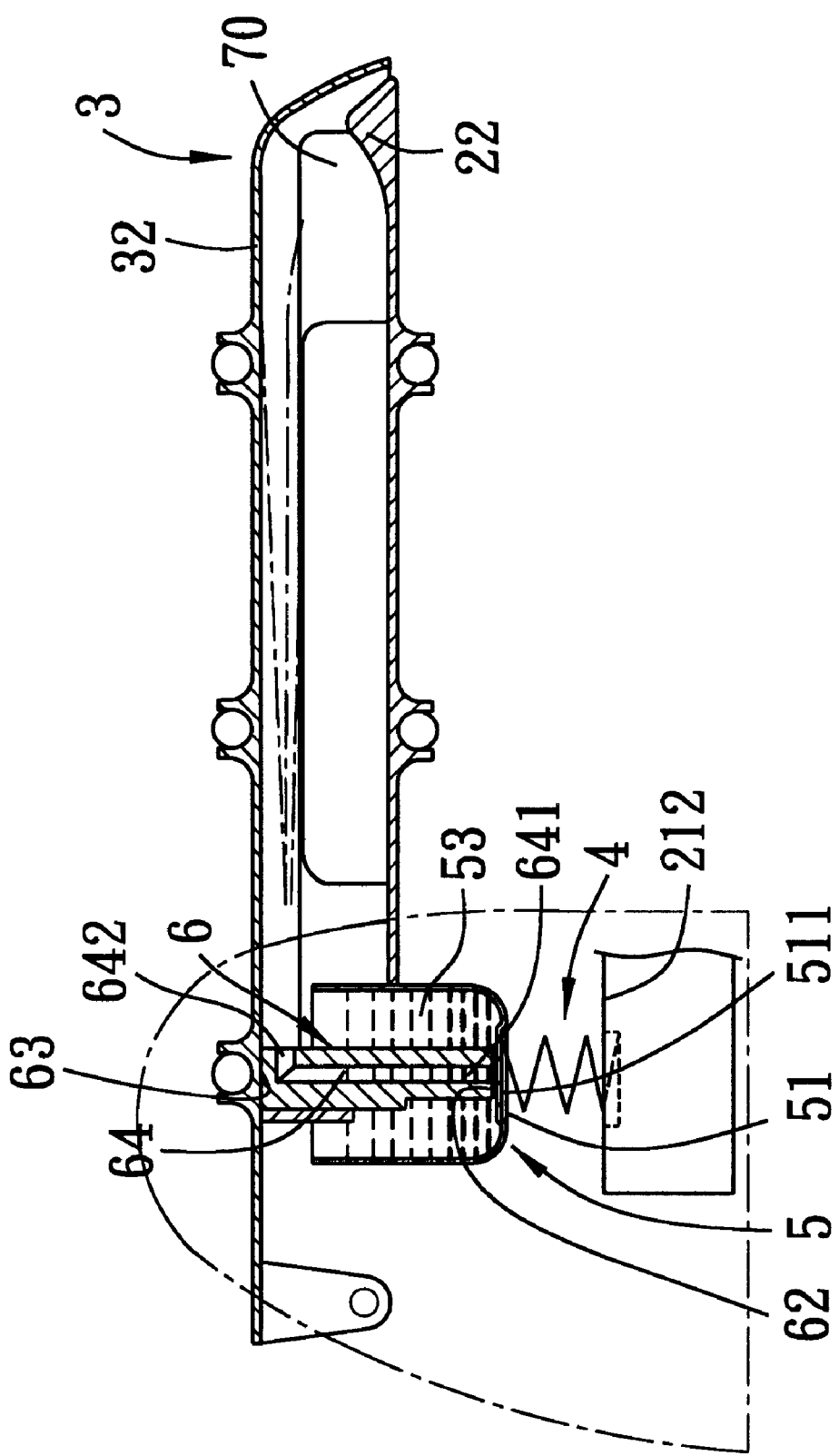
FIG. 4 is a fragmentary sectional view of the preferred embodiment in use, illustrating how a seasoning supplying unit is mounted in a cooking space confined between upper and lower grill units.

Referring to FIGS. 2 to 4, the preferred embodiment of a grill device according to the present invention is shown to include a lower grill unit 2, an upper grill unit 3, and a seasoning supplying unit 5.

As illustrated, the lower grill unit 2 has a rear portion 211 in the form of two spaced apart support stands, and a top that is provided with a lower cooking member 22.

The upper grill unit 3 has a bottom 31 that is provided with an upper cooking member 32, and a rear portion pivoted to the rear portion 211 of the lower grill unit 2 so as to rotate about an axis between an open position, as best shown in FIG. 2, and a closed position, as best shown in FIG. 4, in which, the upper and lower cooking members 32, 22 cooperatively confine a cooking space 70 therebetween.

The seasoning supplying unit 5 includes a vessel 52 and a thermal conductive dispenser 6". The vessel 52 is mounted in the cooking space 70, and is adapted to receive a body of seasonings in liquid form (not shown). The thermal conductive dispenser 6" is mounted in the cooking space 70, and is extendible into the vessel 52 when the upper grill unit 3 is positioned at the closed position. The thermal conductive dispenser 6" defines a plurality of channels 64, each of which has an inlet 641 that is immersed in the body of seasonings in the vessel 52, and an outlet 642 that is exposed from the vessel 52 when the upper grill unit 3 is positioned at the closed position so that, when the thermal conductive dispenser 6" is heated due to a grilling operation, a stream of seasonings continuously enters from the vessel 52 into each of the channels 64 via the inlet 641, and is ejected via the outlet 642 into the cooking space 70 by virtue of vaporization of the stream of seasonings in each of the channels 64.

In this embodiment, the upper cooking member 32 has a rear section 320. The thermal conductive dispenser 6", is integrally connected to the upper cooking member 32 at the rear section 320 by means of a mounting plate 61. Two urging members 4 are provided for urging the vessel 52 toward the thermal conductive dispenser 6" so as to permit immersion of the inlets 641 in the body of seasonings in the vessel 52 when the upper grill unit 3 is disposed at the closed position.

The lower grill unit 2 includes a base member 21 that is disposed below and that is connected to the lower cooking member 22, and that has a rear mounting plate 212. The lower cooking member 22 is formed with a rear notch 221 to expose the rear mounting plate 212 (see FIG. 2). The urging members 4 are mounted on the rear mounting plate 212. The vessel 52 has a bottom 51 seated on the urging members 4 so as to be urged by the urging members 4, and a peripheral wall 53 that extends upwardly from the bottom 51 to define a receiving space for holding the body of seasonings therein.

The thermal conductive dispenser 6", is in the form of a rectangular metal block 6 that is formed with the channels 64. The channels 64 are parallel to one another. The metal block 6 has a connecting end 63 connected to the rear section 320 of the upper cooking member 32, and an immersion end 62 that is opposite to the connecting end 63 and that is immersed in the body of seasonings when the upper cooking unit 3 is positioned at the closed position. The immersion end 62 has an end face 62" that is formed with the inlets 641 of the channels 64. The metal block 6 further has a side face 65 that extends between the connecting end 63 and the immersion end 62, and that is formed with the outlets 642 of the channels 64 adjacent to the connecting end 63.

The bottom 51 of the vessel 52 has an inner bottom face 51" formed with a pair of spaced apart ribs 511 that project therefrom and that extend in a transverse direction relative to the length of the end face 62" of the immersion end 62 in such a manner that the inlets 641 are spaced apart from the bottom face 51" by the ribs 511 so as to prevent blocking of the inlets 641 by the end face 62" of the immersion end 62.

With this invention thus explained, it is apparent that numerous modifications and variations can be made without departing from the scope and spirit of this invention. It is therefore intended that this invention be limited only as indicated in the appended claims.

I claim:

1. A grill device comprising:

a lower grill unit having a rear portion and a top that is provided with a lower cooking member;

an upper grill unit having a bottom that is provided with an upper cooking member, and a rear portion pivoted to said rear portion of said lower grill unit so as to rotate about an axis between an open position, and a closed position, in which, said upper and lower cooking members cooperatively confine a cooking space therebetween; and a seasoning supplying unit including
 a vessel mounted in said cooking space and adapted to receive a body of seasonings in liquid form, and
 a thermal conductive dispenser mounted in said cooking space and extendible into said vessel when said upper grill unit is positioned at said closed position, said thermal conductive dispenser defining a plurality of channels, each of which has an inlet that is immersed in the body of seasonings in said vessel, and an outlet that is exposed from said vessel when said upper grill unit is positioned at said closed position, so that when said thermal conductive dispenser is heated, a stream of seasonings continuously enters from said vessel into each of said channels via said inlet, and is ejected via said outlet into said cooking space by virtue of vaporization of the stream of seasonings in each of said channels.

2. The grill device as defined in claim 1, wherein said upper cooking member has a rear section, said thermal conductive dispenser being integrally formed with said upper cooking member at said rear section, said grill device further comprising an urging member for urging said vessel toward said thermal conductive dispenser so as to permit immersion of said inlets in the body of seasonings when said upper grill unit is disposed at said closed position.

3. The grill device as defined in claim 2, wherein said lower grill unit includes a base member that is disposed below and that is connected to said lower cooking member, and that has a rear mounting plate, said lower cooking member being formed with a rear notch to expose said rear mounting plate, said urging member being mounted on said rear mounting plate, said vessel having a bottom seated on said urging member so as to be urged by said urging member.

4. The grill device as defined in claim 3, wherein said conductive dispenser is in the form of a rectangular metal block that is formed with said channels, said channel being parallel to one another, said metal block having a connecting end connected to said rear section of said upper cooking member and an immersion end that is opposite to said connecting end and that is immersed in the body of seasonings when said upper grill unit is positioned at said closed position, said immersion end having an end face that is formed with said inlets of said channels, said metal block further having a side face extending between said connecting end and said immersion end and being formed with said outlets of said channels adjacent to said connecting end.

5. The grill device as defined in claim 4, wherein said bottom of said vessel has an inner bottom face formed with a pair of spaced apart ribs that project therefrom and that extend in a transverse direction relative to length of said end face of said immersion end in such a manner that said inlets are spaced apart from said bottom face by said ribs so as to prevent blocking of said inlets by said end face of said immersion end.

* * * * *